United States Patent
Steffen et al.

(10) Patent No.: US 10,738,910 B2
(45) Date of Patent: Aug. 11, 2020

(54) VACUUM-TIGHT ANGLE VALVE WITH SLIDING-BLOCK GUIDE DRIVE

(71) Applicant: VAT HOLDING AG, Haag (CH)

(72) Inventors: Roman Steffen, Rebstein (CH); Thomas Vogt, Balzers (LI); Roger Bless, Flums (CH)

(73) Assignee: VAT HOLDING AG, Haag (CH)

(*) Notice: Subject to any disclaimer, the term of this patent is extended or adjusted under 35 U.S.C. 154(b) by 0 days.

(21) Appl. No.: 15/777,077

(22) PCT Filed: Nov. 17, 2016

(86) PCT No.: PCT/EP2016/077944
§ 371 (c)(1),
(2) Date: May 17, 2018

(87) PCT Pub. No.: WO2017/085163
PCT Pub. Date: May 26, 2017

(65) Prior Publication Data
US 2018/0328515 A1 Nov. 15, 2018

(30) Foreign Application Priority Data
Nov. 20, 2015 (EP) ..................................... 15195538

(51) Int. Cl.
*F16K 31/524* (2006.01)
*F16K 51/02* (2006.01)
(Continued)

(52) U.S. Cl.
CPC .......... *F16K 31/52408* (2013.01); *F16K 1/34* (2013.01); *F16K 31/126* (2013.01); *F16K 41/10* (2013.01); *F16K 51/02* (2013.01)

(58) Field of Classification Search
CPC ...... F16K 31/52408; F16K 51/02; F16K 1/34; F16K 31/126; F16K 41/10
(Continued)

(56) References Cited

U.S. PATENT DOCUMENTS

| 27,801 | A | * | 4/1860 | Higginbotham .. F16K 31/52408 |
| | | | | 251/251 |
| 2,005,128 | A | * | 6/1935 | Bowes ............... F16K 31/52408 |
| | | | | 137/630.15 |

(Continued)

FOREIGN PATENT DOCUMENTS

| CN | 101311585 A | 1/2011 |
| CN | 1892080 A | 12/2011 |

(Continued)

OTHER PUBLICATIONS

International Search Report and Written Opinion—PCT/EP2016/077944—ISA/EPO—dated Mar. 2, 2017.

*Primary Examiner* — John Bastianelli
(74) *Attorney, Agent, or Firm* — Muncy, Geissler, Olds & Lowe, P.C.

(57) ABSTRACT

A valve with a valve housing having a first connection along a first axis, a second connection along a second axis and a valve seat which surrounds the first connection arranged in the flow path of a flow chamber. A valve part is displaceable along a movement axis such that a closure surface can interrupt and release the flow path. A motorized drive unit to displace the valve part having a valve rod with a contact element, the drive unit has a guide mechanism with an actuating element configured to rotate about an actuating axis defining an outer track. The distance of the track from the actuating axis is adjustable by a rotation of the actuating element about the actuating axis. A rotation of the actuating (Continued)

Figure 1:
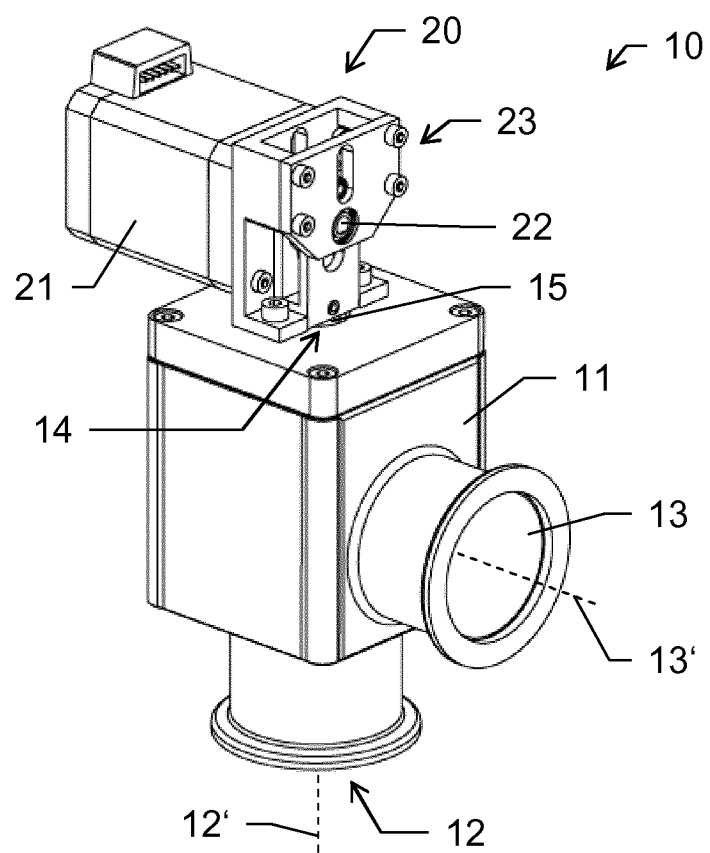

element of the valve part is movable so that the interruption or release of the flow path can be provided thereby.

19 Claims, 3 Drawing Sheets

(51) Int. Cl.
  *F16K 1/34* (2006.01)
  *F16K 41/10* (2006.01)
  *F16K 31/126* (2006.01)

(58) Field of Classification Search
  USPC .................. 251/251–263, 335.3; 74/54–60
  See application file for complete search history.

(56) References Cited

U.S. PATENT DOCUMENTS

| | | | | |
|---|---|---|---|---|
| 2,066,112 A * | 12/1936 | Humblet | ................ | F16K 31/56 |
| | | | | 251/251 |
| 3,229,957 A * | 1/1966 | Jehn | ................ | F16K 31/52408 |
| | | | | 251/251 |
| 4,243,202 A * | 1/1981 | Inamura | ............... | F02M 25/035 |
| | | | | 123/25 L |
| 4,662,604 A * | 5/1987 | Cook | .................... | F02M 26/53 |
| | | | | 123/568.26 |
| 4,721,133 A * | 1/1988 | Sundblom | ............. | F16K 11/022 |
| | | | | 137/883 |
| 5,467,962 A * | 11/1995 | Bircann | ................. | F02M 26/53 |
| | | | | 251/129.15 |
| 5,520,144 A * | 5/1996 | Philo | ....................... | F01L 1/143 |
| | | | | 123/90.5 |
| 5,722,632 A * | 3/1998 | Rader | .................... | F02M 26/57 |
| | | | | 123/568.27 |
| 6,062,826 A * | 5/2000 | Morimoto | ......... | F16K 31/52408 |
| | | | | 137/624.13 |
| 6,321,780 B1 * | 11/2001 | Iwabuchi | ................ | F16K 31/04 |
| | | | | 137/341 |
| 6,669,170 B2 * | 12/2003 | Kersken | .................. | F16K 35/04 |
| | | | | 251/251 |
| 6,772,989 B2 | 8/2004 | Enzaki et al. | | |
| 7,922,151 B2 * | 4/2011 | Petersen | ................ | F16K 41/103 |
| | | | | 251/251 |
| 2002/0011582 A1 | 1/2002 | Kersken et al. | | |
| 2007/0007475 A1 | 1/2007 | Avokelj et al. | | |
| 2016/0258391 A1 * | 9/2016 | Weis | ...................... | F02M 26/52 |

FOREIGN PATENT DOCUMENTS

| | | |
|---|---|---|
| DE | 10 2007 036286 A1 | 2/2009 |
| DE | 10 2011 109664 A1 | 2/2013 |
| DE | 10 2013 220721 A1 | 4/2015 |
| EP | 1 477 062 A1 | 11/2004 |
| WO | 2006045317 A1 | 5/2006 |

* cited by examiner

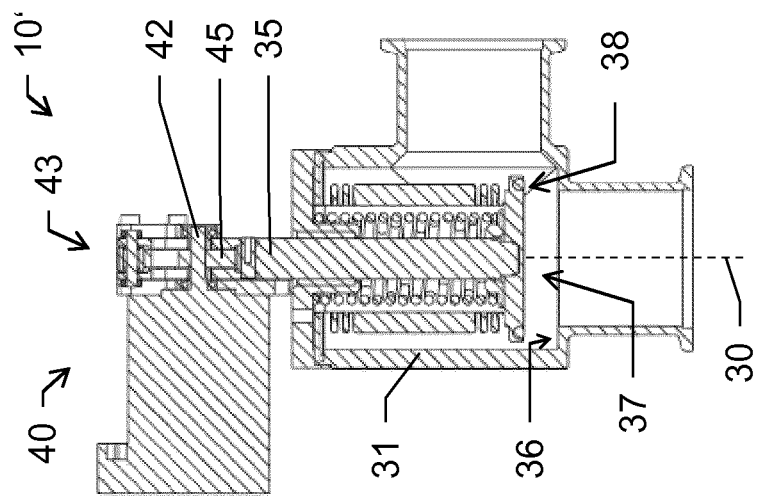
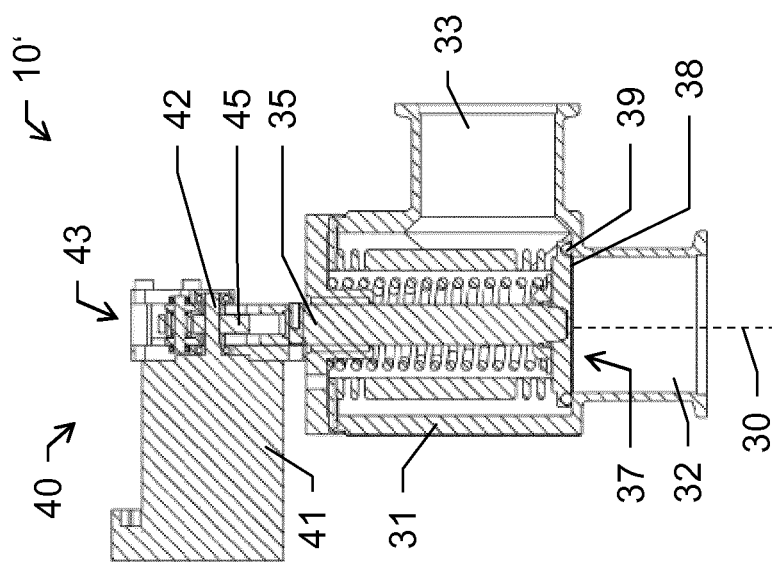

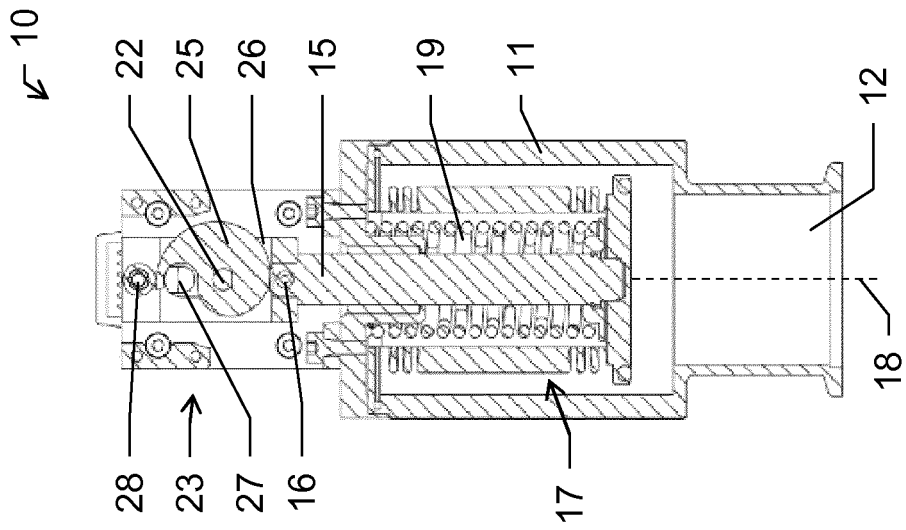
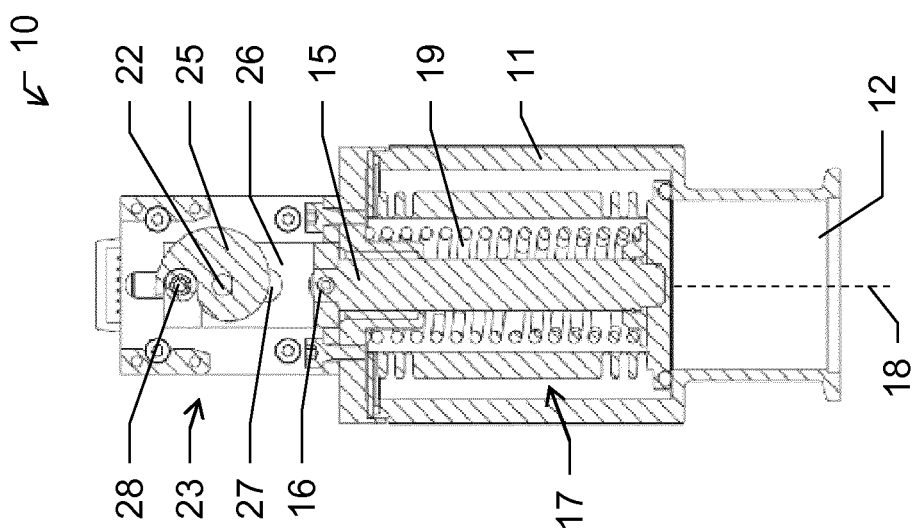

VACUUM-TIGHT ANGLE VALVE WITH SLIDING-BLOCK GUIDE DRIVE

This application is a 371 National Phase of PCT Application No. PCT/EP2016/077944, filed on Nov. 17, 2016; and this application claims priority of Application No. EP 15195538.2 filed in Europe on Nov. 20, 2015, and which is herein incorporated by reference in its entirety.

The present invention relates to a drive for a valve for substantially gas-tight interruption of a flow path between two connections arranged in a corner-shaped manner. Such valves are mainly used in vacuum technology and in particular referred to as a vacuum-tight angle valve.

Valves of the type mentioned above are known in different embodiments from the prior art. Vacuum valves are used in particular in the field of IC and semiconductor manufacturing, which must take place, to the highest possible degree, in a protected atmosphere without the presence of contaminating particles.

A valve known from the prior art and described, for example, in U.S. Pat. No. 6,772,989 has a valve body with two connections arranged perpendicularly to one another in one direction, a valve seat arranged in the flow chamber in a flow path connecting the two connections and an opening opposite the valve seat. In a valve cover which closes the opening, a piston of a pneumatic cylinder system is arranged, which via a valve rod drives a valve disk which opens and closes the valve seat. The valve cover is attached by a bellows plate in a gas-tight manner at the opening. A return spring between the valve disk and the valve cover is compressed when opening the valve seat, so that the valve closes by spring force. The valve cover has a connection, which supplies and removes compressed air in a pressure chamber located on a bellows plate side, which pressure chamber is bounded by the piston. The two ends of a bellows, which surrounds the valve rod, are fastened in a gas-tight manner to the inner edge surface of the bellows plate and the valve disk. The valve disk comprises, on the surface facing the valve seat, an annular retaining groove in which a sealing ring is arranged.

The valve body is typically made of aluminum or stainless steel, or internally coated with aluminum or another suitable material, while the valve disk and bellows are usually made of steel. The bellows which is expandable and compressible in its longitudinal axis within the range of the adjustment path of the plate seals the flow chamber in an airtight manner from the return spring, the valve rod and the pressure chamber. Two types of bellows are used in particular. On the one hand, the membrane bellows, on the other hand, the bellows, the latter thereof being distinguished from the membrane bellows in that it has no weld seams and can be cleaned more easily, but has a lower maximum stroke.

Such valves known from the prior art have the particular disadvantage that the gas flowing through the valve in the flow chamber is exposed to different materials, in particular on the one hand, the aluminum of the valve housing, on the other hand, the steel of the bellows and the disk. With many gases, there may be a reaction between the gas and the material of the valve, so that it is desired, if possible, to use only one single material in the flow chamber of the valve. For some processes, the presence of steel is completely undesirable. Thus, it is desirable to provide a valve of the type mentioned above, in the flow chamber of which essentially exclusively aluminum or another material suitable for the respective process is used. Aluminum, in particular, is hardly suitable for producing a widely expandable bellows.

From WO 2006/045317 A1, another angle valve is known, which has a manually operable mechanism for opening and closing the valve. A lever which is rotatable about 180° for example protrudes from the interior of the mechanism and is connected to an equally rotatable inner sliding-block guide. By moving the lever and interaction of the sliding-block guide with an element following this sliding-block guide, the opening and closing of the valve can be implemented. Due to its specific construction, the system has a comparatively large area, which represents a connection between the internal mechanism and the environment (slot in the housing for moving the lever).

A major disadvantage of such a construction and for systems used in vacuum technology in general is the vulnerability of this sliding-block guide mechanism for contamination or other environmental influences (e.g. formation or distribution of particles, penetration of moisture in the mechanism, etc.) and a thereby caused impairment, especially a long-term impairment, in the reliable operation of the valve.

Another disadvantage of this system is the lack of precise controllability of the position of the valve closure due to the realized operability. Here it is up to the skill of a user to decide how a volume flow through the valve can be controlled exactly on the one hand and how fast and well-adapted to a process the closing or opening of the valve takes place on the other hand.

In this case, for example, a controlled opening and closing of such a valve is desired in the context of a production process, whereby a state change of the valve (open/closed) can be timed with a loading or unloading of a process chamber.

Such coordinated control could result in significant time savings and thus a much more efficient process.

The object of the invention is therefore to provide an improved angle valve for use in the vacuum area, which overcomes the above-mentioned disadvantages.

In particular, it is an object of the invention to provide such a vacuum-tight angle valve, which in the case of an actually occurring functional impairment allows a quick and easy replacement of the drive mechanism, in particular without interference with the flow chamber or the interior of the valve, or at least diminishes susceptibility to such impairment.

Furthermore, it is an object to provide a more precise or more adapted (on a production process) controllable angle valve of the type indicated above.

The (vacuum) valve according to the invention for essentially gas-tight interruption of a flow path has a valve housing which has a first connection in the direction of a first axis and a second connection in the direction of a second axis extending substantially perpendicularly to the first axis, so that the two connections are positioned at right angles and square to each other. The axes of the connections are defined for example by their longitudinal course, the course of an arranged nozzle or by the inlet surfaces in the flow chamber. The connections have a circular cross-section, for example. The first connection is enclosed by a valve seat, which is arranged in the flow path of the flow chamber connecting the first connection and the second connection. The flow chamber is that portion of the valve which can be flooded with gas in the closed or opened state of the valve, at least from one of the two connections.

The valve also has a valve part, e.g. a cylindrical piston which is axially displaceable at least partially within the flow chamber along a movement axis perpendicularly to a surface of the valve seat by an adjustment path. This movement axis essentially corresponds to the first axis. However, it is alternatively possible for the axis to run in a slightly different direction. By displacing the part, a closure face of the part facing the valve seat, comprising in particular a first sealing body—for example in the form of an O-ring located in a fastening groove—can be brought into contact or brought out of contact with the valve seat. As a result, the flow path is either interrupted or released in a substantially gas-tight manner. The closure surface is formed by the end face of the valve part. The closure surface and the surface of the valve seat are designed such that they can come to rest on one another. Preferably, the movement axis of the valve part is perpendicular to both surfaces. However, it is alternatively possible that the two surfaces are designed in an oblique or uneven manner. In this case, the closure surface and the surface of the valve seat are to be understood as virtual, averaged surfaces to which the axis is perpendicular.

An advantage of the valve according to the invention is that substantially only the valve housing and the valve part (the piston) directly adjoin the flow chamber of the valve. Since only the smoothly formable closure surface, the smoothly formable outer surface of the valve part and the inner surface of the valve housing are thus exposed to the medium flowing through the valve, e.g. gas, the valve has a low contamination tendency and a possible reaction surface for the gas is low. This is particularly advantageous when used in the vacuum area, wherein particle avoidance is typically set as a main requirement for such a vacuum valve. The valve part can be made in particular of aluminum or another suitable material, so that it is possible to use only a single material in the flow chamber. Thus, the risk of unwanted reactions between a valve part and the gas decreases. Furthermore, the proportion of the volume of the flow chamber that is directly involved in the flow is relatively large, so that flow losses are low.

The valve also has a motorized drive unit for displacement of the valve part along the axis of movement. Thus, opening and closing of the valve can be controlled by means of a defined control of the drive unit and thus be carried out precisely.

The valve part (e.g. the piston) also has a valve rod with a contact element arranged on the valve rod, such as a pin or bolt. The valve rod forms in particular a connecting piece between the movable valve part providing the valve function and the drive unit. By means of such a coupling, the controlled movement of the drive unit can now be converted into a controllable movement of the valve part.

For a corresponding implementation of the movement of the drive unit, it comprises an actuating element which is rotatably mounted about an actuating axis, e.g. a cam disk. The actuating element is rotatably arranged about the actuating axis in a controlled motorized manner and defines by its shape an outer track whose distance to the actuating axis varies within a certain rotational angle range.

By such an arrangement, the distance of the track to the actuating axis with respect to a certain reference angle with respect to the actuating axis, i.e. with respect to a certain angular position relative to the actuating axis, becomes variably adjustable by a rotation of the actuating element in a certain rotational angle position about the actuating axis.

To provide a defined and controllable mobility of the valve part, the drive unit and the valve part are arranged relative to each other so that the contact element of the valve rod and the guide element of the drive unit cooperate such that by means of a rotation of the actuating element about the drive shaft, the valve part is movable so that thereby the interruption or release of the flow path can be provided.

The valve is designed in particular as a vacuum valve or in particular as a vacuum-tight angle valve.

According to a preferred embodiment of the invention, during the rotation of the actuating element, the rotational movement of the actuating element is transformed into a linear movement of the valve part. Such a transformation takes place independently of the direction of rotation of the actuating element, so that a corresponding linear movement of the valve part can thereby also be generated in two directions (one linear direction for each rotational direction).

In particular, the guide mechanism has a guide element, which is designed and arranged relative to the actuating element such that a rotational movement of the actuating element is transformed into a linear movement of the guide element. The guide element may therefore comprise a sliding-block guide, wherein the sliding-block guide surrounds the actuating axis, and the guide element forms together with the actuating element a sliding-block guide drive about the actuating axis.

Furthermore, the guide element may be formed as at least one guide plate with an elongated recess embodying the sliding-block guide and a guide web mechanically interacting with the actuating element.

According to a certain embodiment, the guide mechanism comprises the actuating element designed as a flat cam disk and a guide element consisting of two plates. The actuating element is also arranged in parallel between the plates arranged in parallel. The actuating axis extends both through the actuating element and through the respective elongated recess of the two guide plates. The guide plates are thus movable in the context of the dimension and shape of the recesses relative to the actuating axis. Both plates are connected by a guide web. The web also extends into one recess or recesses on both sides in the housing of the guide mechanism, wherein said recesses correspond with respect to their elongated extension substantially to the recesses of the two plates. On this web, a force is applied by means of rotation of the actuating element, i.e. the cam disk contacts the web. In addition, the guide plates are connected to the contact element (pin) of the valve rod. Thus, the plates are in a fixed position relative to each other and movably defined by the recesses and the web. If the recesses of the plates are elongated and their width is formed in accordance with the diameter of the actuating axis, the only possible movement for the guiding element remains a linear movement. Such a guide mechanism with a corresponding drive unit can be understood as a sliding-block guide drive, wherein the sliding-block guide is provided by mentioned recesses.

With regard to the configuration of the actuating element, different shapes and dimensions are conceivable for this purpose. Their common feature is that a linear displacement of a guide element is provided by a rotation of the actuating element. Particularly suitable for this purpose are flat, eccentrically mounted objects which are edgeless with respect to a projection of the surface, e.g. an elliptical body rotatably mounted in and around one of its focal points.

According to a specific embodiment, the outer track of the actuating element defines with respect to the reference angle, i.e. with respect to a fixed reference direction, a rotational angle-dependent distance of the actuating axis to an edge (=edge of the surface relevant to the producible change in distance) of the actuating element.

The track may at least partially have a defined pitch, in particular wherein the distance of the track to the actuating axis varies equally strong with respect to the same rotational angle ranges. As a result, by means of a continuous rotation of the actuating element, an equally continuous linear movement of the guide element can be implemented.

The shape of the actuating element can also be designed such that upon rotation of the element in one direction an increase or decrease of the distance does not take place exclusively, but the distance also remains the same in this case during rotation or decreases again against the previous increase or vice versa increases. Also, a variation of the change in distance can be defined over a rotational angle.

According to a further embodiment, the distance for a first rotational angle position ($\alpha$) of the actuating element is minimal and the distance for a second rotational angle position ($\beta$) is at a maximum, wherein between the first and second rotational angle position there is a rotational angle difference of at least 90°, in particular at least 180° or at least 360°. Depending on the shape of the control element, a rotation of the element of in particular 540° or more may be required for a change from the minimum to the maximum distance.

Regarding the configuration of the actuating element, it may be formed as a cam disk, wherein the surface boundary lines thereof at least partially describe a distance to the actuating axis which substantially increases relative to a rotation of the cam disk in a first rotational direction about the actuating axis. The cam disk may with respect to its structure be helical in particular.

Furthermore, the outer track can run at least partially spirally and extend over a rotational angle range of at least and especially more than 360°. This allows the spiral shape, for example, to be designed so tightly that a change from a closed position of the valve part to a maximum open position of the valve part requires multiple revolutions of the actuating element and thereby the contact element is continuously pushed or pulled linearly in one direction.

According to a specific embodiment of the invention, the actuating axis is embodied by a drive shaft of the drive unit and the actuating element is rotatably mounted about the drive shaft, i.e. the actuating element is accordingly co-moved directly by a rotational movement of the drive shaft (at respectively same angles).

Alternatively, the actuating axis can be arranged, for example, offset parallel to the drive shaft and the actuating axis can be driven by means of a gear increase or gear reduction via the drive shaft in a gear ratio thus determined.

Another embodiment of the invention relates to the interaction of guide mechanism and valve rod. In this case, the contact element and the actuating element cooperate in such a way that the contact element directly contacts the outer track of the actuating element (i.e. without an intermediate guide element such as the aforementioned guide plate) and a linear movement of the contact element along the axis of movement can be provided by means of a rotational movement of the actuating element. Thereby, the contact element can be acted upon by a force against the surface normal in the respective contact point with the actuating element and thereby be pressed onto the actuating element. Such a pretension can be provided for example by means of a tensioned spring.

In other words, the contact element, which is formed as a pin for example, and the actuating element may be in contact for generating a movement of the valve part and as a result of a rotation of the actuating element the pin is moved in a direction away from or towards the actuating axis by the thus changing distance of the surface boundary of the actuating element to the drive shaft (the pin is pretensioned for this purpose in such a contact position especially for example by means of a spring arranged on the valve part). As a result, a similar movement of the valve part is effected and the flow path can thus be closed or (partly) opened in a controlled manner.

According to a further embodiment, the valve part may be pretensioned such that in a closed angle position of the actuating element at most a counterforce which is less than a pretensioning force thus produced is exerted on the contact element and the closure surface of the valve part is present in this case while being in contact with the valve seat. By rotation of the actuating element about the actuating axis by a defined rotational angle, an open-angle position of the actuating element can then be adjusted in which a force is exerted on the contact element against and greater than the pretensioning force and the closure surface of the valve part and the valve seat are then out of contact, which means the flow path is thus not interrupted.

The valve housing may furthermore have a passage opening, wherein the valve rod is arranged and configured to extend through the passage opening and the contact element is present outside the valve housing. As a result, the transition area between the valve interior and the exterior can be kept very small and therefore less prone to entering contaminants. In addition, since the contact element, which represents a connecting piece to the drive mechanism, is present outside the housing such an exchange of the drive components can occur very easily and without intervention in the valve interior or in a process volume. In this case, only a mechanical separation of the contact element from the guide mechanism is to be carried out. This can be done in particular by a simple release of the pin (bolt).

With regard to the configuration of the contact element, such implementation can be realized in that a contact surface provided at one end of the valve rod embodies the contact element. Alternatively, the contact element may be formed as a connecting pin, which is mechanically connected to the guide mechanism, in particular to the guide element.

The device according to the invention is described in more detail below purely by way of example with reference to concrete exemplary embodiments shown schematically in the drawings, wherein further advantages of the invention are also discussed. The drawings show the following in detail:

FIG. 1 shows a first embodiment of an angle valve with a drive unit according to the invention;

FIGS. 2a-b show a further embodiment of the angle valve according to the invention with a motorized drive unit in a cross section; and FIGS. 3a-b show a further embodiment of a valve according to the invention in a closed position and an open position in the longitudinal section.

FIG. 1 shows a valve 10 designed as an angle valve for the preferred use in the vacuum region with a drive unit 20 according to the invention.

The angle valve 10 has a valve housing 11 with a first connection 12 and a second connection 13. The connections 12, 13 are aligned substantially orthogonally to each other. The first connection 12 correspondingly defines a first axis 12' and the second connection 13 a second axis 13', wherein these axes 12', 13' are also correspondingly orthogonal relative to each other. An intersection point lies inside the housing 11.

The two connections 12, 13 define a flow path for a medium or fluid which extends through the housing 11 and which can be interrupted or released by means of the valve 10.

The drive unit 20 has a controllable motor 21 whose drive shaft 22 is structurally connected to a closing component of the valve 10 by means of a drive mechanism 23 (guide mechanism).

Within the valve housing 11, a movable valve part is arranged, which has a closure surface, by means of which a gas-tight interruption of the flow path can be provided when contacting a housing-side valve seat. This valve part may be formed, for example, as a piston with a bellows. A valve rod 15 adjoins the valve part. The housing 11 has a sealed upper-side passage opening 14 through which the valve rod 15 is guided. A contact element is further provided on the valve rod 15, e.g. a pin or bolt, which is in indirect mechanical contact with the drive shaft 22 of the motor 21 (by means of the guide mechanism 23). As a result of a rotation of the drive shaft 22, a substantially linear movement of the valve rod 15 can thus be implemented.

To protect against possible environmental influences (penetration of particles or moisture into the mechanism), the guide mechanism 23 or also this mechanism 23 can be additionally enclosed together with the motor 21 so that ultimately alone a connecting cable provided for driving the motor 21 would be guided through such an enclosure. As a result of this encapsulation, a negative effect of disturbing environmental influences can be reduced or avoided altogether.

FIGS. 2a and 2b show an embodiment of the vacuum-tight angle valve 10' according to the invention with motorized drive unit 40 in a cross section. FIG. 2a shows a closed state of the valve 10' and FIG. 2b shows an opened state.

In the closed state, a closure surface 38 of an inner valve part 37 is in contact with the valve seat 36 of the housing 31. The valve part 37 or the closure surface 38 also comprise a sealing material 39, e.g. an O-ring made of fluoropolymer, which is arranged according to the shape of the corresponding valve seat 36, in particular integrally formed thereon.

The valve seat 36 is arranged around the first connection 32 of the valve 10'. The second connection 33 of the angle valve 10' is aligned orthogonally thereto.

As a result of a movement of the valve part 37 along a movement axis 30, which in particular is parallel or coaxial to the first axis defined by the first connection 32, i.e. it corresponds in particular thereto, the valve 10' can be opened or closed. The flow path through the valve 10' can thus be interrupted or released.

The valve part 37 is formed here, as illustrated, as a piston with a bellows, which is displaceable in the valve housing 31 substantially axially along the movement axis 30. The piston can be acted upon by means of a spring with a force such that the piston is pressed in the direction of the valve seat 36 and provides for a gas-tight closure of the valve 10' solely by the spring force thus applied. The bellows is in this case designed such that only its upper and its lower part is structured in a folded manner, but the middle part is made with a smooth lateral surface. Thereby, a significant reduction of a possible reaction surface (for a through-flowing process medium) can be achieved.

A valve rod 35 protrudes out of the housing 11 on a side of the housing 11 opposite the first connection 33. At the passage opening provided for this purpose sealing components are provided accordingly, so that a seal of the valve interior with respect to the environment is ensured even in the case of a movement of the valve rod 35. As a result of such a design, an interface for the valve drive, i.e. a transition between the interior of the valve and the environment, can be kept very small, so that on the one hand the probability of contamination of the drive mechanism in the valve housing and the process volume is significantly improved, i.e. reduced. Furthermore, such a solution offers a very simple interchangeability of the outer drive mechanism, i.e. the drive unit, e.g. in the case of a defect. For this purpose, no intervention in the valve interior or the process volume is necessary, whereby a production process during such an exchange is not or only slightly affected.

The valve rod 15 extends for this purpose towards a guide mechanism 43, which is designed and arranged for the controlled movement of the valve rod 15 and thus of the entire valve part 37. The guide mechanism 43 has an actuating element 45, which is connected to a drive shaft 42 of the motor 41 of the drive unit 40.

Depending on a rotational position of the actuating element 45, the position of the valve part 37 along the movement axis 30 can be defined and optionally changed. In other words, by the configuration and the relative arrangement of the guide mechanism 43 relative to the valve rod a rotational movement of the actuating element 45 is translated into a linear movement of the valve rod 35 or the valve part 37.

As can be seen in FIG. 2b, the flow path in the illustrated open state of the valve 10' is released, i.e. a medium (e.g. gas) or a fluid can flow from one of the two connections 32 and 33 to the other. The open position is caused by a force applied against the spring force, which leads to a compression of the spring. The counterforce is adjustable and changeable in a controlled manner by the drive unit 40, in particular by a defined angular position of the actuating element 45.

An operation and interaction of the guide mechanism 43 with the valve rod 35 will be described by way of example in connection with an embodiment according to FIGS. 3a and 3b.

FIG. 3a shows an embodiment of a valve 10 according to the invention in a closed position and FIG. 3b shows the valve 10 in an open position. The figures illustrate an angle valve 10 substantially according to FIG. 1 in a longitudinal section. The angle valve 10 is preferably designed as a vacuum-tight angle valve for use in the vacuum range, i.e., for example, for closing and opening a process chamber operated under vacuum conditions.

In a valve housing 11, a valve part 17 is arranged which is substantially movable along the movement axis 18. By bringing the closure surface of the valve part 17 in contact with the valve seat, which is designed to extend around the connection 12, an interruption of a flow path leading through the housing 11 can be provided. For this purpose, either the valve seat or the closure surface preferably has a seal made of at least partially elastic material, e.g. of elastomer.

The valve 10 also has a spring 19, which is pretensioned between the valve housing 11 and the valve part 17 and thus causes a force in the direction of the connection 12. In the illustrated embodiment, the spring 19 is arranged concentrically around a valve rod 15. However, the invention is not limited to such an arrangement or generally to the provision of a spring 19, but also includes embodiments with an alternative spring arrangement, e.g. parallel to the valve rod 15, or with an alternative component for applying a corresponding pretensioning force, e.g. an elastically compressible component.

The valve rod 15 is guided through a side of the housing, here the upper side. Between the valve rod 15 and the housing wall of the upper side, a sealing material is provided in order to prevent a medium exchange between the valve interior and the outer environment on the one hand and to prevent ingress of contaminants (dirt, particle residues, etc.) into the valve body on the other hand. In the illustrated embodiment, the valve rod 15 has a contact element 16 in the form of a pin or bolt. The contact element may alternatively (not shown) be formed by one end side of the valve rod 15, by a specifically configured contact surface or a similar component for establishing a mechanical connection with a guide mechanism 23. The contact element 16 is provided for the purpose of providing a connection of the valve part 17 with the drive unit. This allows a controlled movement or position of the valve part 17 by means of the drive unit.

The drive unit comprises the guide mechanism 23, which is connected to a drive shaft 22 (drive shaft) of the drive unit or an engine. A rotational movement of the shaft 22 can be forwarded and transformed by means of the mechanism 23 in the desired manner.

The guide mechanism 23 has, in the embodiment shown here, an actuating element 25 which is connected directly to the drive shaft 22. A rotation of the shaft 22 thus means an equiangular rotation of the actuating element 25. The drive shaft 22 thus embodies an actuating axis about which the actuating element is rotatably mounted. It is understood that the invention in this aspect is not limited to the embodiment shown here, but alternative connections between shaft 22 and actuating element 25 are also included in the invention, e.g. a connection with a transmission by means of pinions of different diameters, wherein the drive shaft 22 and an actuating axis of the guide mechanism 23 are offset in parallel.

The actuating element 25 is formed as shown as a flat cam disk. This cam disk is helical or formed helically with respect to its outer boundary line. The distance between the outer track, i.e. the contour line, of the actuating element 25 to the actuating axis (here: drive shaft 22) is dependent on the rotational position of the actuating element 25 or a change in this position with respect to a relative reference angle, i.e. for example with respect to a position relative to the movement axis. In other words, considering a fixed line from the actuating axis to the first connection (e.g. movement axis), the distance between the actuating axis and the edge of the actuating element 25 thus changes with a rotation of the actuating element 25.

The actuating element 25 may alternatively (not shown) have a different shape than shown. However, such an alternative form still provides a variable distance between the outer track and the actuating axis with the rotation of the actuating element 25. For example, the actuating element may have a kind of potato shape or an elliptical shape. The element 25 is then preferably mounted eccentrically, e.g. in one of the two ellipse focal points.

In addition, the guide mechanism 23 has a guide element 26. The guide element 26 is designed here as at least one substantially rectangular plate, in particular as two plates engaging the actuating element 25 on two opposite sides, having an elongated recess 27. The guide element 26 also has a web 28, which is in contact with the actuating element 25 and to which a movement of the actuating element 25 is transmitted accordingly. The drive shaft 22 is arranged with the guide element 26 such that the recess 27 extends around the drive shaft 22. The guide member 26 is thus movable according to the inner boundary of its recess 27 relative to the drive shaft 22. In the embodiment shown, a linear movement of the guide element 26 is possible parallel to the movement axis 18.

In FIG. 3a, the valve system 10 is shown closed. The guide web 28 is present in a kind of bay of the actuating element 25. This position can be considered a rest position. In this case, the web 28 has assumed its lowest possible position with respect to a linear movement in the direction of the connection 12. This is due to the smallest distance in this case between the actuating axis and the outer track of the actuating element 25. The components of the valve 10 are matched with respect to their dimensions and relative arrangements so that in this rest position, the closure surface of the valve part 17 is pressed onto the valve seat (by means of the spring). As a result of the connection of the web 28 with the guide element 26, i.e. the plate, it is also in its lowest position.

In this embodiment, the contact element 16 is firmly connected to the guide element 26, i.e. a force exerted on the guide element 26 is likewise transmitted to the contact element 16 and thus to the valve rod 15.

FIG. 3b shows the valve 10 in the open state. The closure surface is not in contact with the valve seat.

Compared to the state according to FIG. 3a, the actuating element 25 is rotated by 360° in the clockwise direction. This rotation moves the guide web 28 away from the connection 12 during rotation in a direction of movement. This is caused by the thus increasing distance of the outer track of the actuating element 25 to the drive shaft in the direction of the web 28.

The speed of movement of the web 28 depends in this case on the slope of the curve defined by the shape of the actuating element 25 and the rotational speed of the defined drive shaft 22.

As a result of the mechanical connection of the guide plate 26 with the valve rod 15 (by means of the contact element 16) a force (in the figure in the upward direction) is thus exerted by said rotational movement of the actuating element 25 on the web 28 and said movement is translated due to the specific configuration of the guide mechanism 23 into a linear movement (of the web 28, the guide element 26, the valve rod 15 and the entire valve part 17) in this direction. The piston 17 is thus pulled upwards against the spring force.

Due to its sliding-block guide formed by the recess 27, in this case, the guide element 26 is moved about the drive shaft 22 in the context of the substantially only remaining degree of freedom linearly along the axis of movement 18.

With the described embodiment, therefore, a very precise position of the valve part 17 can be effected and held in the valve housing 11, especially by a defined adjustment angle change for the actuating element 25 which can embody in particular all angular positions between α=0° (corresponds to the rest position) and β=360° (corresponds to the shown maximum open position). In particular, depending on the shape of the actuating element, such a rotational angle change may be more than 360°.

It is thus possible to set any desired open position between the closed position (FIG. 3a) and the maximum opening (FIG. 3b) and thus a defined volume flow for the flow path, i.e. every intermediate position. In addition, this can be done fully automatically by a corresponding control of the drive unit and accordingly very accurately. Furthermore, the opening or closing (by rotation of the actuating element 25 counterclockwise) of the valve 10 can be carried out relatively quickly and adjusted in time to a production process as a result of the controllability.

According to a further embodiment (not shown), the valve part can be pressurized with a force by means of a tension spring for example so that the tensile force acts in a direction which—without acting counterforce—produces a disengagement of the closure side from the valve seat. The guide mechanism is then designed so that for closing the valve a counterforce is generated by means of rotation of the actuating element. The actuating element is then present in such a closed state rotated by, for example, 180° relative to the previous embodiment. In such an embodiment, a mere contact surface on the part of the valve rod and also on the part of the guide element is sufficient as a contact element, since the valve rod is always pressed onto the guide element by the spring force.

It is understood that the illustrated figures schematically represent only possible exemplary embodiments. The various approaches can also be combined according to the invention as well as with devices for closing process volumes under vacuum conditions of the prior art.

The invention claimed is:

1. A vacuum valve for the substantially gas-tight interruption of a flow path, comprising
    a valve housing, which comprises
        a first connection in the direction of a first axis,
        a second connection in the direction of a second axis extending substantially orthogonally to the first axis, and
        a valve seat which encloses the first connection and is arranged in the flow path of a flow chamber connecting the first connection and the second connection with each other,
    a valve part which is displaceable by an adjustment path in an axially guided manner at least partially within the flow chamber along a movement axis, substantially corresponding to the first axis, perpendicular to a surface of the valve seat such that a closure surface of the valve part facing the valve seat can be brought into contact with the valve seat for the substantially gas-tight interruption of the flow path and can be brought out of contact for releasing the flow path, and
    a motorized drive unit for providing a controlled displacement of the valve part along the movement axis, wherein
    the valve part has a valve rod with a contact element,
    the valve part has a bellows which seals the flow chamber from the valve rod,
    the drive unit has a guide mechanism with an actuating element rotatably mounted about an actuating axis, wherein the actuating element,
        is rotatably arranged in a controlled motorized manner about the actuating axis and an outer track is defined by a shape of the actuating element and a distance from the actuating axis varies in a certain rotational angle range,
    the distance of the track from the actuating axis with respect to a certain reference angle about the actuating axis is adjustable by a rotation of the actuating element in a certain rotational angle position about the actuating axis and
    the drive unit and the valve part are arranged relative to each other such that the contact element of the valve rod and the guide mechanism of the drive unit cooperate in such a way that by means of a rotation of the actuating element about the actuating axis, the valve part is movable so that thereby the interruption or the release of the flow path can be provided.

2. The vacuum valve according to claim 1, wherein during the rotation of the actuating element, the rotational movement of the actuating element is transformed into a linear movement of the valve part.

3. The vacuum valve according to claim 1, wherein the guide mechanism has a guide element which is designed and arranged relative to the actuating element such that a rotational movement of the actuating element is transformed into a linear movement of the guide element.

4. The vacuum valve according to claim 3, wherein the guide element has a sliding-block guide, wherein the sliding-block guide surrounds the actuating axis, and the guide element, together with the actuating element, forms a sliding-block guide drive about the actuating axis.

5. The vacuum valve according to claim 4, wherein the guide element is designed as at least one guide plate with an elongated recess embodying the sliding-block guide and a guide web interacting mechanically with the actuating element.

6. The vacuum valve according to claim 1, wherein the track with respect to the reference angle defines a rotational angle-dependent distance of the actuating axis from an edge of the actuating element.

7. The vacuum valve according to claim 1, wherein the track has at least partially a slope, wherein the distance of the track from the actuating axis varies homogenously with respect to a change of the rotational angle.

8. The vacuum valve according to claim 1, wherein the distance for a first angular position ($\alpha$) is minimal and the distance for a second rotational angle position ($\beta$) is maximal, wherein between the first and second rotational angle position a difference exists in the rotational angle of at least 90°.

9. The vacuum valve according to claim 1, wherein the outer track extends at least partially spirally and extends over a rotational angle range of at least 360°.

10. The vacuum valve according to claim 1, wherein the actuating axis is embodied by a drive shaft of the drive unit and the actuating element is rotatably mounted about the drive shaft.

11. The vacuum valve according to claim 1, wherein the contact element and the actuating element interact in such a way that the contact element contacts the outer track of the actuating element and a linear movement of the contact element along the axis of movement can be provided by means of a rotational movement of the actuating element.

12. The vacuum valve according to claim 1, wherein
    the valve part is pretensioned such that in a closed angle position of the actuating element at most a counterforce less than a caused pretensioning force is exerted on the contact element and the closure surface of the valve part is in contact with the valve seat, and
    by a rotation of the actuating element about the actuating axis about a defined rotational angle an open-angle position of the actuating element is adjustable, in which a force is exerted on the contact element against and greater than the pretensioning force and
    the closure surface of the valve part and the valve seat are out of contact.

13. The vacuum valve according to claim 1, wherein the contact element
    embodies a contact surface provided at one end of the valve rod or
    is formed as a connecting pin, which is mechanically connected to the guide mechanism.

14. The vacuum valve according to claim 1, wherein the valve seat comprises a sealing material.

15. The vacuum valve according to claim 1, wherein the vacuum valve is a vacuum-tight angle valve.

16. The vacuum valve according to claim 8, wherein between the first and second rotational angle position a difference exists in the rotational angle of at least 180° or at least 360°.

17. The vacuum valve according to claim 11, wherein the contact element is acted upon by a force against the surface normal in the respective contact point with the actuating element and is thereby pressed onto the actuating element.

18. The vacuum valve according to claim 1, wherein the actuating element is designed as a cam disk, wherein the surface boundary lines at least partially describe a distance from the actuating axis which substantially increases relative to a rotation of the cam disk in a first rotational direction about the actuating axis.

19. The vacuum valve according to claim 1, wherein the valve housing has a passage opening, wherein the valve rod is arranged and designed to extend through the passage opening and the contact element is outside the valve housing.

* * * * *